(12) United States Patent
Gupta

(10) Patent No.: US 12,170,661 B2
(45) Date of Patent: Dec. 17, 2024

(54) SYSTEM AND METHOD FOR AUGMENTED AUTHENTICATION USING ACOUSTIC DEVICES

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 423 days.

(21) Appl. No.: 17/568,463

(22) Filed: Jan. 4, 2022

(65) Prior Publication Data

US 2023/0216845 A1 Jul. 6, 2023

(51) Int. Cl.
| | |
|---|---|
| *H04L 9/40* | (2022.01) |
| *G10L 17/04* | (2013.01) |
| *G10L 17/06* | (2013.01) |
| *G10L 17/22* | (2013.01) |
| *G06F 3/01* | (2006.01) |

(52) U.S. Cl.
CPC .......... *H04L 63/0861* (2013.01); *G10L 17/04* (2013.01); *G10L 17/06* (2013.01); *G10L 17/22* (2013.01); *H04L 63/0853* (2013.01); *G06F 3/016* (2013.01)

(58) Field of Classification Search
CPC .................................................... H04L 9/3231
See application file for complete search history.

(56) References Cited

U.S. PATENT DOCUMENTS

| | | | |
|---|---|---|---|
| 7,509,119 | B2 | 3/2009 | Eonnet |
| 8,010,367 | B2 | 8/2011 | Muschett et al. |
| 8,082,448 | B2 | 12/2011 | Vandervort |
| 8,187,202 | B2 | 5/2012 | Akkermans et al. |
| 9,118,488 | B2 | 8/2015 | Donaldson |
| 9,262,612 | B2 | 2/2016 | Cheyer |
| 9,858,403 | B2 | 1/2018 | Guo et al. |
| 9,942,681 | B2 | 4/2018 | Dufosse et al. |
| 10,062,388 | B2 | 8/2018 | Ady et al. |
| 10,146,923 | B2 | 12/2018 | Pitkanen et al. |
| 10,762,483 | B2* | 9/2020 | Bondesen ............ G06Q 20/385 |
| 10,778,667 | B2 | 9/2020 | Muttik et al. |
| 10,936,580 | B2 | 3/2021 | Shi et al. |
| 10,984,083 | B2 | 4/2021 | Lesso et al. |
| 2018/0146370 | A1 | 5/2018 | Krishnaswamy et al. |

(Continued)

*Primary Examiner* — Chris Parry
*Assistant Examiner* — Abderrahmen Chouat
(74) *Attorney, Agent, or Firm* — Moore & Van Allen PLLC; Nicholas C. Russell

(57) ABSTRACT

Systems, methods, and computer program products are provided for augmented authentication using acoustic devices. The method includes receiving a transfer request including an NFT identifier from one of one or more acoustic devices. The NFT identifier corresponds to an acoustic device NFT associated with the given acoustic device and a device user. The method includes comparing the NFT identifier with one or more stored NFT identifiers to determine the given acoustic device associated with the NFT identifier. The method further includes confirming that the identity of the voice command user matches the device user associated with the acoustic device. The method still further includes causing an authentication of the transfer request upon confirming the acoustic device is associated with the voice command user.

20 Claims, 8 Drawing Sheets

(56) References Cited

U.S. PATENT DOCUMENTS

| | | |
|---|---|---|
| 2019/0012444 A1 | 1/2019 | Esso et al. |
| 2020/0213121 A1 | 7/2020 | Hioki |
| 2020/0242105 A1 | 7/2020 | Rich et al. |
| 2021/0009750 A1 | 1/2021 | Collin et al. |
| 2021/0034157 A1 | 2/2021 | Lee et al. |
| 2021/0042746 A1 | 2/2021 | Westland |
| 2022/0383295 A1* | 12/2022 | Cox .................. G06Q 20/3278 |
| 2023/0066272 A1* | 3/2023 | Patel .................. G06Q 20/326 |
| 2023/0086291 A1* | 3/2023 | Itagaki .................. A61B 5/273 |
| | | 600/509 |
| 2023/0092012 A1* | 3/2023 | Matthews .......... G06Q 20/0658 |
| 2023/0144857 A1* | 5/2023 | Khan .................... H04L 9/3247 |
| | | 713/168 |
| 2023/0188528 A1* | 6/2023 | Arora ..................... H04L 63/10 |
| | | 726/4 |
| 2023/0361985 A1* | 11/2023 | Raheman ................ G06F 21/64 |

\* cited by examiner

SYSTEM AND METHOD FOR AUGMENTED AUTHENTICATION USING ACOUSTIC DEVICES

TECHNOLOGICAL FIELD

An example embodiment relates generally to using acoustic devices, and more particularly, to providing authentication using acoustic devices.

BACKGROUND

Acoustic devices are becoming more widespread as voice command technology improves. However, using acoustic devices for authentication is still difficult as there lacks a method of verifying both voice commands and device information without difficulties. As such, there exists a need for a system that allows for improved acoustic device integration.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for augmented authentication using acoustic devices is provided. The system includes at least one non-transitory storage device and at least one processing device coupled to the at least one non-transitory storage device. The at least one processing device is configured to receive a transfer request including an NFT identifier from one of one or more acoustic devices. The transfer request includes a verbal command from a voice command user and the NFT identifier corresponds to one of one or more acoustic device NFT that is associated with the given acoustic device and a device user. The at least one processing device is also configured to compare the NFT identifier with one or more stored NFT identifiers to determine the given acoustic device associated with the NFT identifier. The one or more stored NFT identifiers correspond to the one or more acoustic device NFTs stored on a blockchain and each of the one or more acoustic device NFTs is associated with a unique acoustic device of the one or more acoustic devices. The at least one processing device is further configured to confirm that the identity of the voice command user matches the device user associated with the acoustic device. Confirming the identity of the voice command user matches the device user associated with the acoustic device includes comparing the transfer request with a voice sample of the device user. The at least one processing device is still further configured to cause an authentication of the transfer request upon confirming the acoustic device is associated with the voice command user. The authentication includes transmitting user account information to the acoustic device for execution of a transfer relating to the transfer request.

In some embodiments, the at least one processing device is further configured to receive an acoustic device registration request from the device user to be associated with the given acoustic device and generate the acoustic device NFT and the NFT identifier for the given acoustic device. In some embodiments, the at least one processing device is further configured to store the acoustic device NFT corresponding to the NFT identifier associated with the given acoustic device on the blockchain. In some embodiments, the acoustic device registration request is received from an application on a mobile phone.

In some embodiments, the at least one processing device is further configured to register, along with the NFT identifier, one or more user accounts associated with the device user. In some embodiments, each of the one or more acoustic device NFTs correspond to a non-fungible token registered in the blockchain with the non-fungible token including information relating to the acoustic device, the device user, and one or more user accounts associated with the device user. In some embodiments, the at least one processing device is further configured to receive an acoustic confirmation of the device user from the acoustic device with the acoustic confirmation being at least one of a verbal or haptic response to a request for acoustic confirmation.

In another example embodiment, a computer program product for augmented authentication using acoustic devices is provided. The computer program product includes at least one non-transitory computer-readable medium having computer-readable program code portions embodied therein. The computer-readable program code portions include an executable portion configured to receive a transfer request including an NFT identifier from one of one or more acoustic devices. The transfer request includes a verbal command from a voice command user and the NFT identifier corresponds to one of one or more acoustic device NFTs that is associated with the given acoustic device and a device user. The computer-readable program code portions also include an executable portion configured to compare the NFT identifier with one or more stored NFT identifiers to determine the given acoustic device associated with the NFT identifier. The one or more stored NFT identifiers correspond to the one or more acoustic device NFTs stored on a blockchain and each of the one or more acoustic device NFTs is associated with a unique acoustic device of the one or more acoustic devices. The computer-readable program code portions further include an executable portion configured to confirm that the identity of the voice command user matches the device user associated with the acoustic device. Confirming the identity of the voice command user matches the device user associated with the acoustic device includes comparing the transfer request with a voice sample of the device user. The computer-readable program code portions still further include an executable portion configured to cause an authentication of the transfer request upon confirming the acoustic device is associated with the voice command user. The authentication includes transmitting user account information to the acoustic device for execution of a transfer relating to the transfer request.

In some embodiments, the computer-readable program code portions further include an executable portion configured to receive an acoustic device registration request from the device user to be associated with the given acoustic device and generate the acoustic device NFT and the NFT identifier for the given acoustic device. In some embodiments, the computer-readable program code portions further include an executable portion configured to store the acoustic device NFT corresponding to the NFT identifier associated with the given acoustic device on the blockchain. In some embodiments, the acoustic device registration request is received from an application on a mobile phone.

In some embodiments, the computer-readable program code portions further include an executable portion configured to register, along with the NFT identifier, one or more user accounts associated with the device user. In some embodiments, each of the one or more acoustic device NFTs correspond to a non-fungible token registered in the blockchain with the non-fungible token including information relating to the acoustic device, the device user, and one or more user accounts associated with the device user. In some embodiments, the computer-readable program code portions further include an executable portion configured to receive an acoustic confirmation of the device user from the acoustic device with the acoustic confirmation being at least one of a verbal or haptic response to a request for acoustic confirmation.

In still another example embodiment, a computer-implemented method for augmented authentication using acoustic devices is provided. The method includes receiving a transfer request including an NFT identifier from one of one or more acoustic devices. The transfer request includes a verbal command from a voice command user and the NFT identifier corresponds to one of one or more acoustic device NFTs that is associated with the given acoustic device and a device user. The method also includes comparing the NFT identifier with one or more stored NFT identifiers to determine the given acoustic device associated with the NFT identifier. The one or more stored NFT identifiers correspond to the one or more acoustic device NFTs stored on a blockchain and each of the one or more acoustic device NFTs is associated with a unique acoustic device of the one or more acoustic devices. The method further includes confirming that the identity of the voice command user matches the device user associated with the acoustic device. Confirming the identity of the voice command user matches the device user associated with the acoustic device includes comparing the transfer request with a voice sample of the device user. The method still further includes causing an authentication of the transfer request upon confirming the acoustic device is associated with the voice command user. The authentication includes transmitting user account information to the acoustic device for execution of a transfer relating to the transfer request.

In some embodiments, the method also includes receiving an acoustic device registration request from the device user to be associated with the given acoustic device and generating the acoustic device NFT and the NFT identifier for the given acoustic device. In some embodiments, the method also includes storing the acoustic device NFT corresponding to the NFT identifier associated with the given acoustic device on the blockchain. In some embodiments, the method also includes registering, along with the NFT identifier, one or more user accounts associated with the device user.

In some embodiments, each of the one or more acoustic device NFTs correspond to a non-fungible token registered in the blockchain with the non-fungible token including information relating to the acoustic device, the device user, and one or more user accounts associated with the device user. In some embodiments, the method also includes receiving an acoustic confirmation of the device user from the acoustic device, wherein the acoustic confirmation is at least one of a verbal or haptic response to a request for acoustic confirmation.

Embodiments of the present disclosure address the above needs and/or achieve other advantages by providing apparatuses (e.g., a system, computer program product and/or other devices) and methods for augmented authentication using acoustic devices. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

BRIEF DESCRIPTION OF THE DRAWINGS

Figure 1:
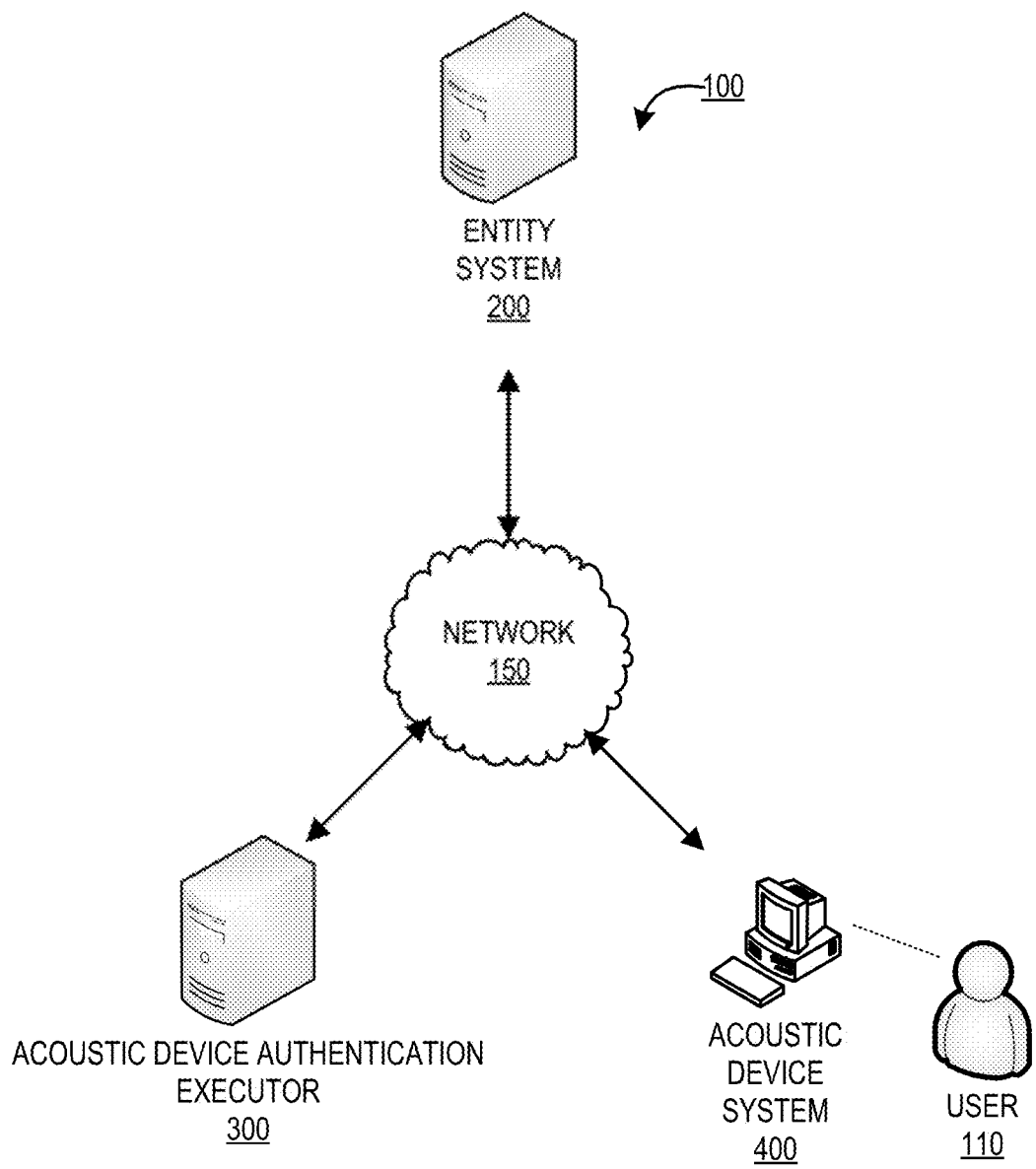
Figure 2:
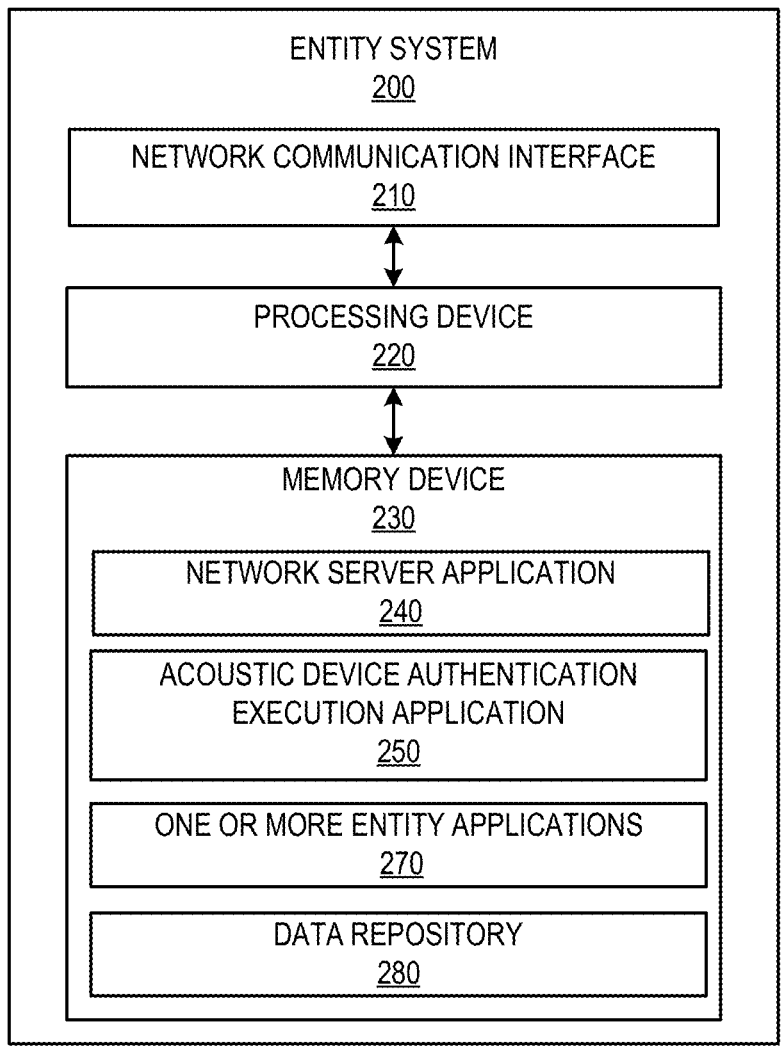
Figure 3:
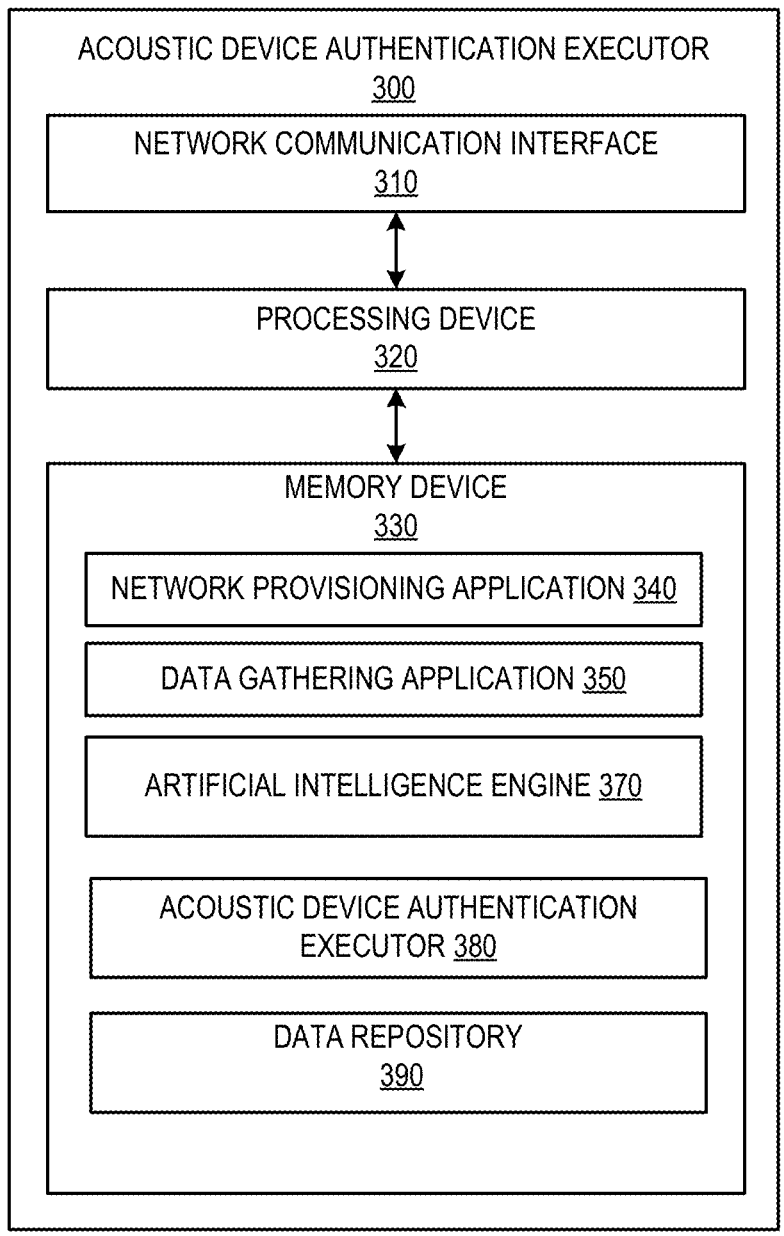
Figure 4:
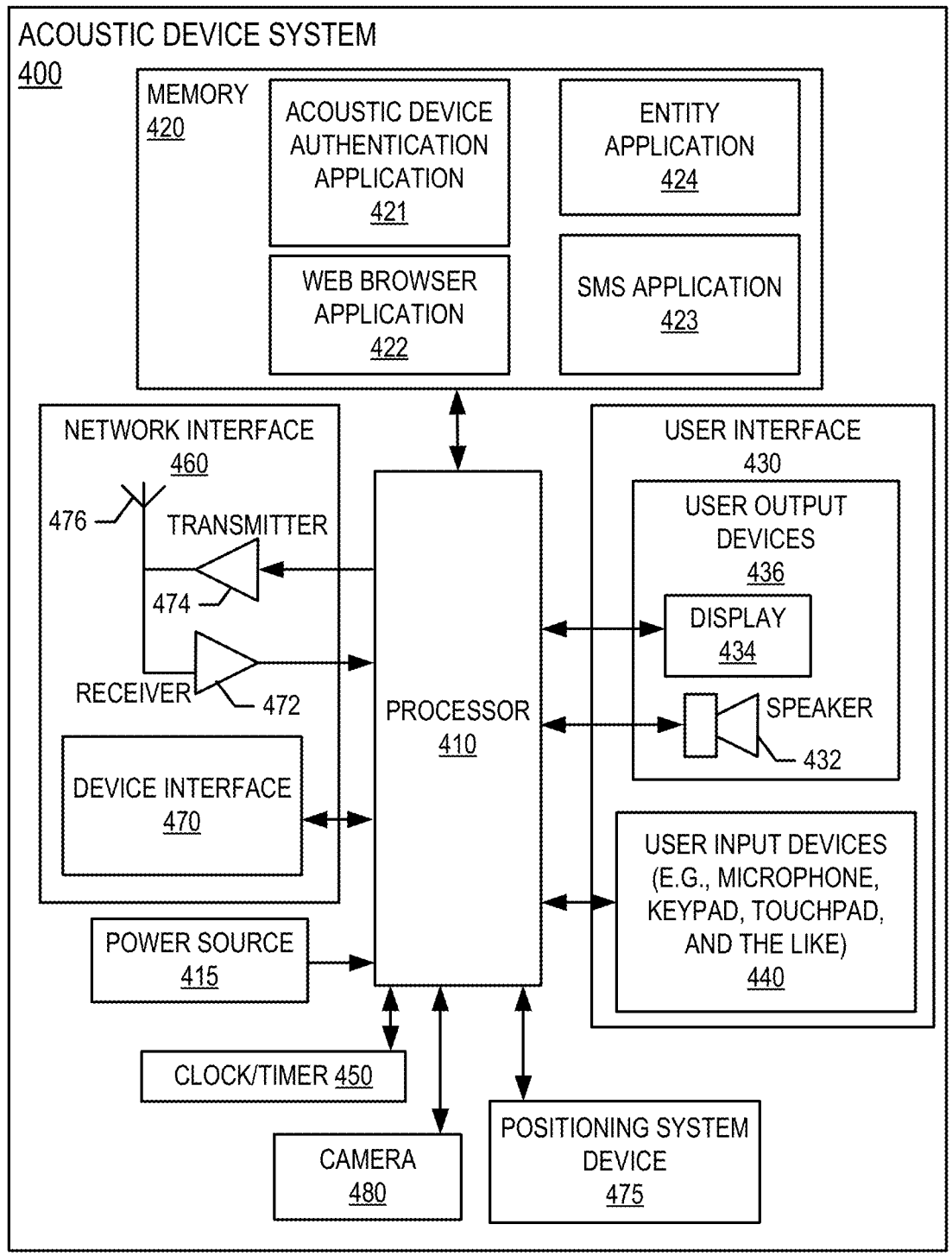
Figure 5:
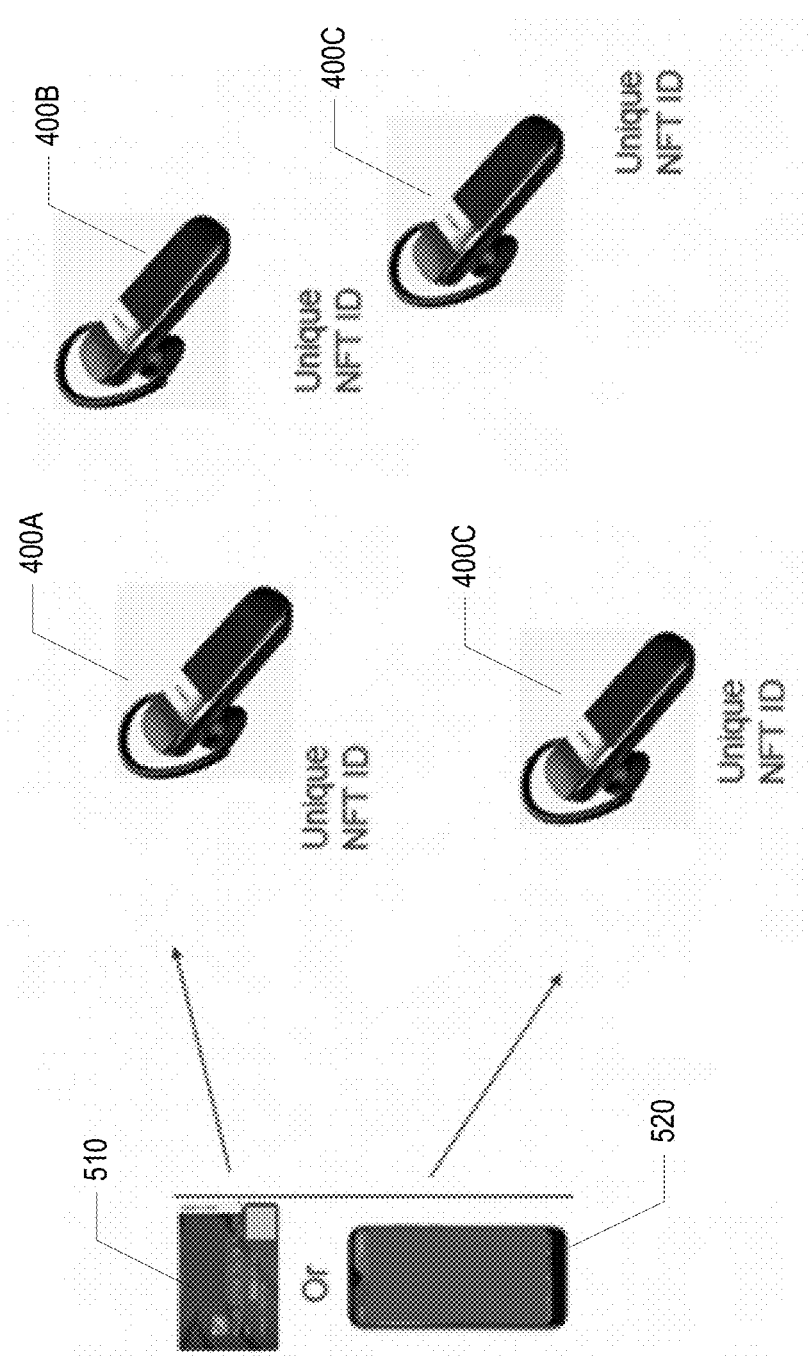
Figure 6:
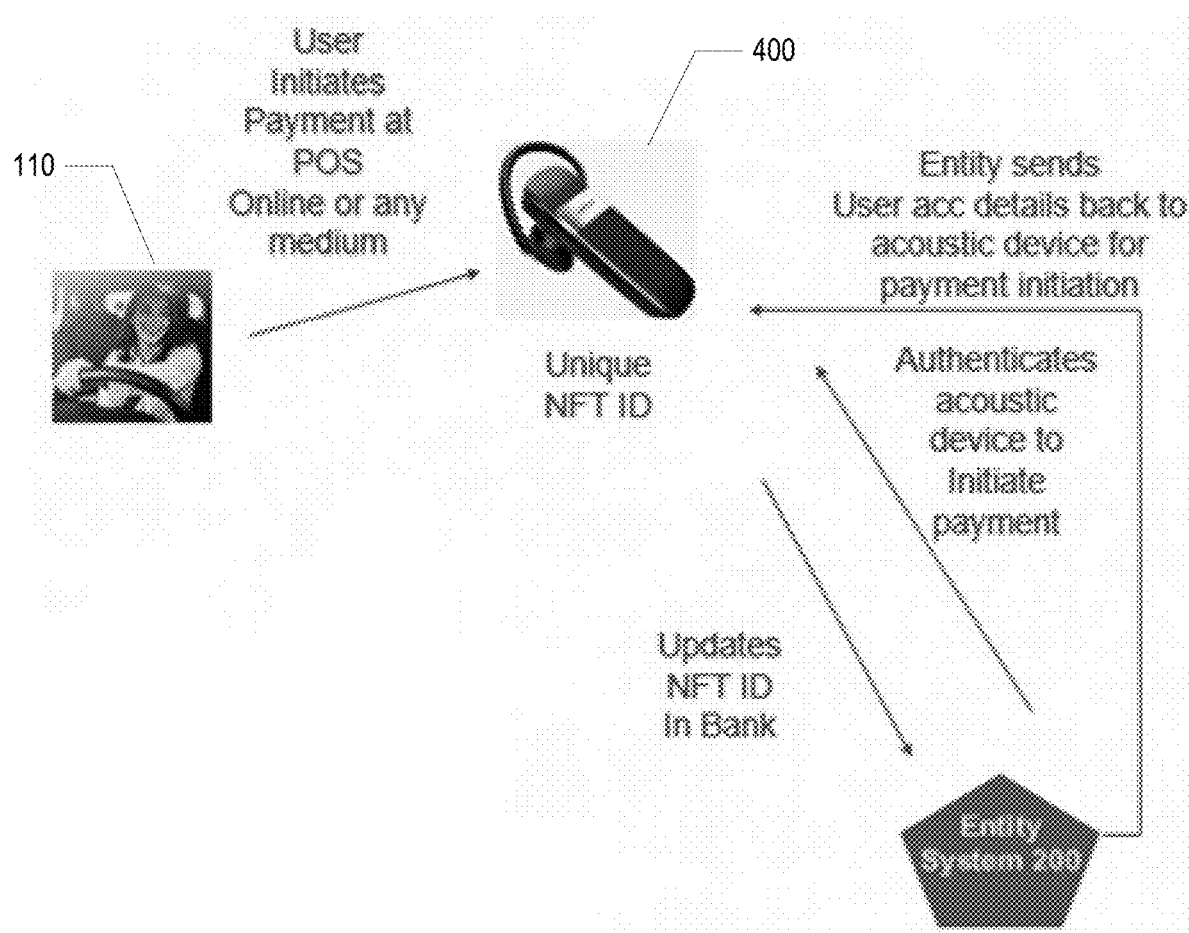
Figure 7:
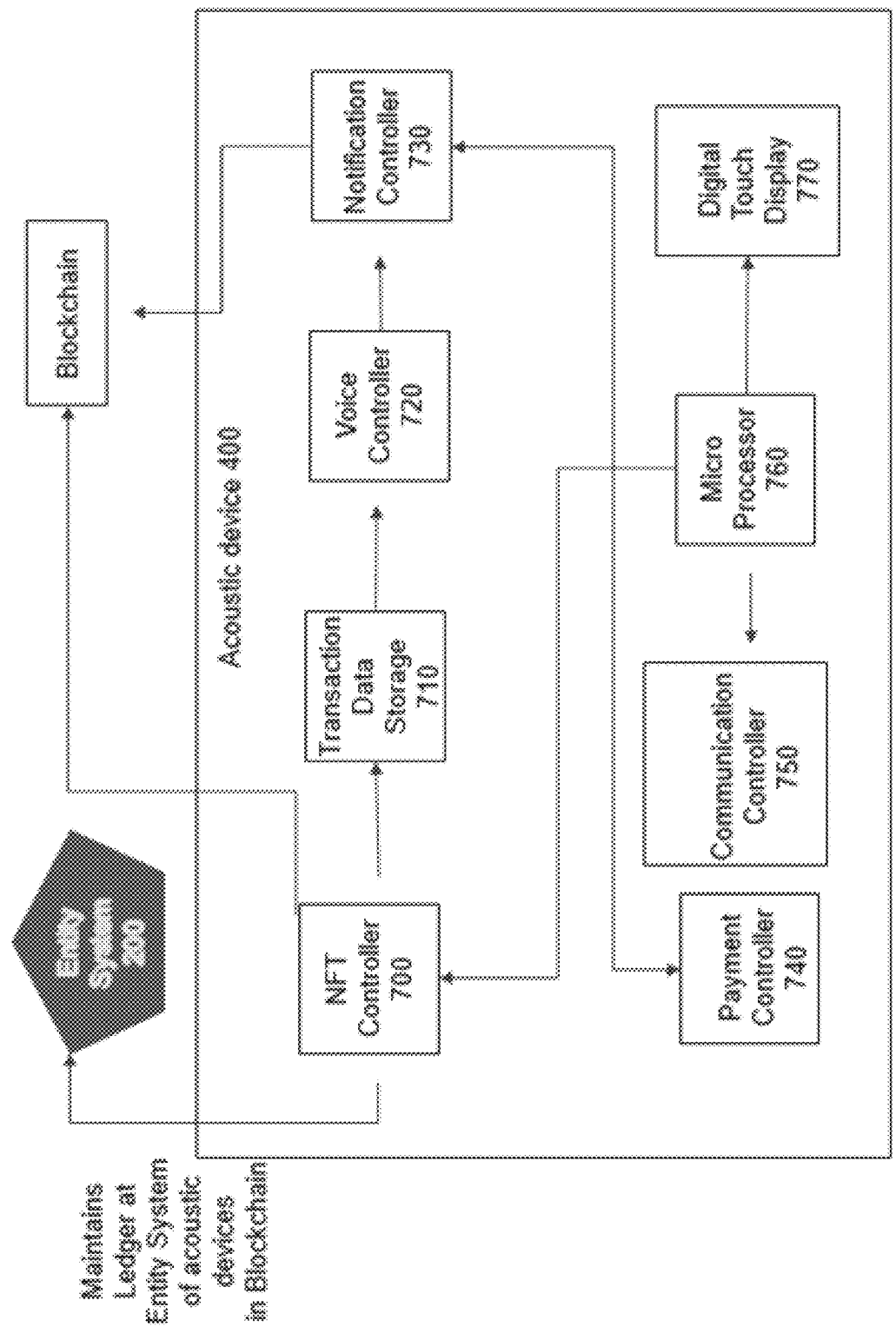
Figure 8:
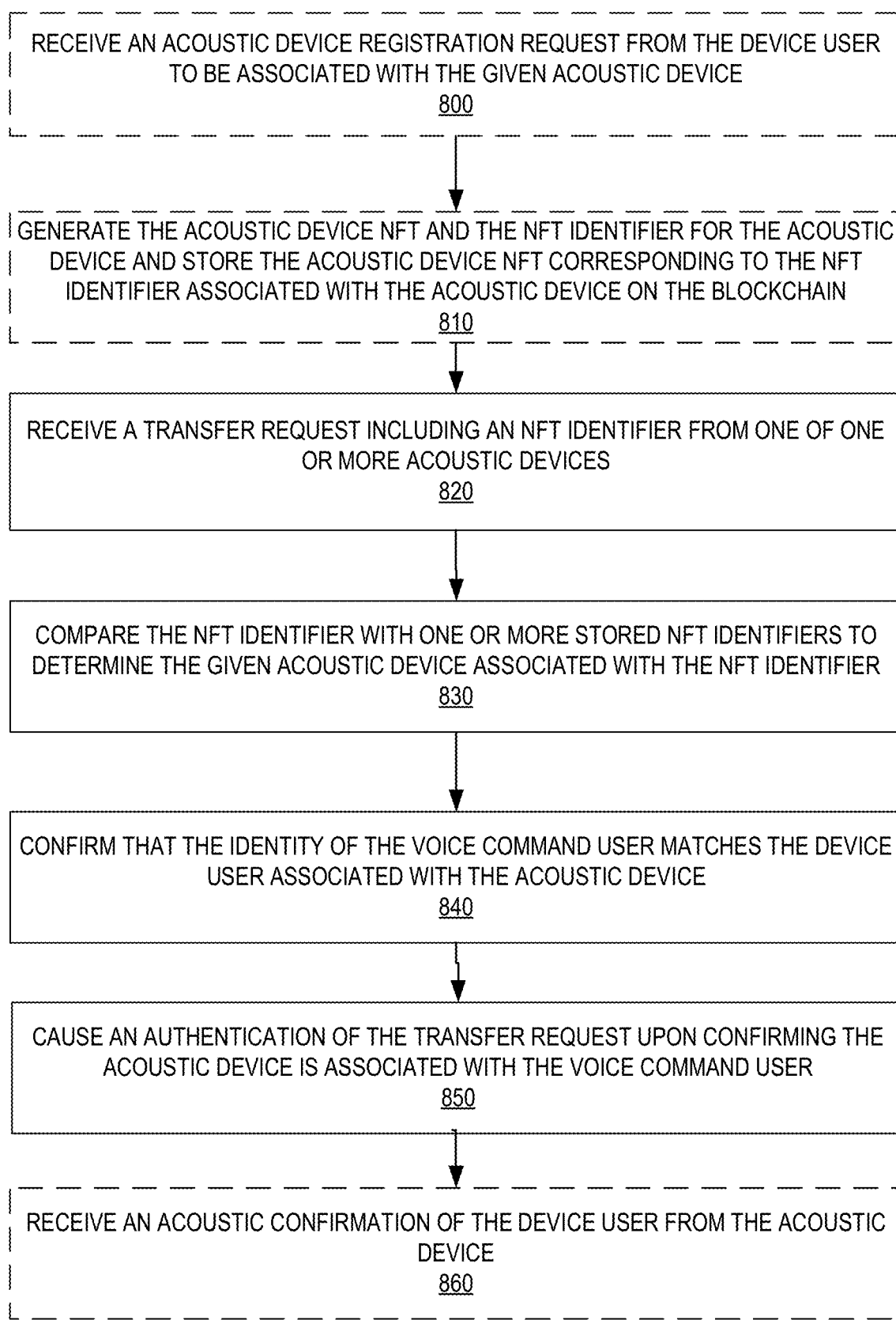

Having thus described embodiments of the invention in general terms, reference will now be made the accompanying drawings, wherein:

FIG. 1 provides a block diagram illustrating a system environment for augmented authentication using acoustic devices, in accordance with an embodiment of the present disclosure;

FIG. 2 provides a block diagram illustrating the entity system 200 of FIG. 1, in accordance with an embodiment of the present disclosure;

FIG. 3 provides a block diagram illustrating an acoustic device authentication executor 300 of FIG. 1, in accordance with an embodiment of the present disclosure;

FIG. 4 provides a block diagram illustrating the acoustic device system 400 of FIG. 1, in accordance with an embodiment of the present disclosure;

FIG. 5 provides a diagram illustrating the registration of an acoustic device with an entity system in accordance with an embodiment of the present disclosure;

FIG. 6 provides a diagram illustrating the interactions between an acoustic device and the entity system 200 in accordance with an embodiment of the present disclosure;

FIG. 7 provides an additional block diagram illustrating an example acoustic device system 400 in accordance with an embodiment of the present disclosure; and FIG. 8 provides a flowchart illustrating a method of augmented authentication using acoustic devices in accordance with embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

A "device user" is the user associated with a given acoustic device. A "voice command user" is the user that provides a voice command on a given acoustic device. The device user and the voice command user may be the same user (e.g., the user associated with the acoustic device may provide the voice command on the given acoustic device). As discussed herein, the system is configured to confirm that the device user and the voice command user are the same user before executing any voice command.

Acoustic devices, such as wearable acoustic devices, are not currently leveraged properly for digital transactions and transfers. The lack of acoustic device integration is often due to having no proper way to identify individual acoustic devices to allow for voice commands to be secure.

Various embodiments of the present disclosure use non-fungible tokens (NFTs) in order to associate acoustic devices with given users and/or user accounts. For each acoustic device registered with an entity system, the acoustic device is registered as an acoustic device NFT in a blockchain. Each acoustic device is given a unique NFT identification number (NFT ID) that corresponds to the given acoustic device NFT. Therefore, each acoustic device has a unique NFT ID that corresponds to the unique acoustic device. Associating the acoustic device with one or more user accounts may be completed via a mobile application. Upon registration of the acoustic device on the blockchain, the user may use the acoustic device to make payments or transfers via voice commands. The given voice command may be authenticated based on the NFT ID of the acoustic device and voice samples of the user.

In an example operation, the user can initiate a payment through an acoustic device by voicing out the command to the microphone of the acoustic device. Upon receiving the voice command, the acoustic device may communicate with the entity system, which in turn authenticates the acoustic device using the NFT ID of the acoustic device. Additional authentication may also be used. Upon verification, the entity system may proceed with carrying out the voice command (e.g., providing user account information to the acoustic device or an intended transferee).

FIG. 1 provides a block diagram illustrating a system environment 100 for augmented authentication using acoustic devices, in accordance with an embodiment of the invention. As illustrated in FIG. 1, the environment 100 includes an entity system 200, an acoustic device authentication executor 300, and an acoustic device system 400. One or more users 110 may be included in the system environment 100, where the users 110 interact with the other entities of the system environment 100 via the acoustic device system 400. In some embodiments, the one or more user(s) 110 of the system environment 100 may be customers of an entity associated with the entity system 200. For example, the user(s) 110 may be customers of a financial institution.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The acoustic device authentication executor 300 is a system of the present disclosure for performing one or more process steps described herein. In some embodiments, the acoustic device authentication executor 300 may be an independent system. In some embodiments, the acoustic device authentication executor 300 may be a part of the entity system 200.

The acoustic device authentication executor 300, the entity system 200, and the acoustic device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the acoustic device authentication executor 300 is configured to communicate information or instructions with the entity system 200, and/or the acoustic device system 400 across the network 150.

The acoustic device system 400 may be a system owned or controlled by the entity of the entity system 200 and/or the user 110. As such, the acoustic device system 400 may be a computing device of the user 110. In general, the acoustic device system 400 communicates with the user 110 via an acoustic speaker of the acoustic device system 400, and in turn is configured to communicate information or instructions with the acoustic device authentication executor 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an acoustic device authentication execution application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the acoustic device authentication execution application 250, the one or more entity application 270 to perform certain logic, data-extraction, and data-storing functions of the entity system 200 described herein, as well as communication functions of the entity system 200.

The network server application 240, the acoustic device authentication execution application 250, and the one or more entity applications 270 are configured to store data in the data repository 280 or to use the data stored in the data repository 280 when communicating through the network communication interface 210 with the acoustic device authentication executor 300, and/or the acoustic device system 400 to perform one or more process steps described herein. In some embodiments, the entity system 200 may receive instructions from the acoustic device authentication executor 300 via the acoustic device authentication execution application 250 to perform certain operations. The acoustic device authentication execution application 250 may be provided by the acoustic device authentication executor 300. The one or more entity applications 270 may be any of the applications used, created, modified, facilitated, and/or managed by the entity system 200.

FIG. 3 provides a block diagram illustrating the acoustic device authentication executor 300 in greater detail, in accordance with embodiments of the invention. As illustrated in FIG. 3, in one embodiment of the invention, the acoustic device authentication executor 300 includes one or more processing devices 320 operatively coupled to a network communication interface 310 and a memory device 330. In certain embodiments, the acoustic device authentication executor 300 is operated by an entity, such as a financial institution. In some embodiments, the acoustic device authentication executor 300 is owned or operated by the entity of the entity system 200. In some embodiments, the acoustic device authentication executor 300 may be an independent system. In alternate embodiments, the acoustic device authentication executor 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the acoustic device authentication executor 300 described herein. For example, in one embodiment of the acoustic device authentication executor 300, the memory device 330 includes, but is not limited to, a network provisioning application 340, a data gathering application 350, an artificial intelligence engine 370, an acoustic device authentication executor 380, and a data repository 390 comprising any data processed or accessed by one or more applications in the memory device 330. The computer-executable program code of the network provisioning application 340, the data gathering application 350, the artificial intelligence engine 370, and the acoustic device authentication executor 380 may instruct the processing device 320 to perform certain logic, data-processing, and data-storing functions of the acoustic device authentication executor 300 described herein, as well as communication functions of the acoustic device authentication executor 300.

The network provisioning application 340, the data gathering application 350, the artificial intelligence engine 370, and the acoustic device authentication executor 380 are configured to invoke or use the data in the data repository 390 when communicating through the network communication interface 310 with the entity system 200, and/or the acoustic device system 400. In some embodiments, the network provisioning application 340, the data gathering application 350, the artificial intelligence engine 370, and the acoustic device authentication executor 380 may store the data extracted or received from the entity system 200, and the acoustic device system 400 in the data repository 390. In some embodiments, the network provisioning application 340, the data gathering application 350, the artificial intelligence engine 370, and the acoustic device authentication executor 380 may be a part of a single application.

FIG. 4 provides a block diagram illustrating an acoustic device system 400 of FIG. 1 in more detail, in accordance with embodiments of the invention. However, it should be understood that a mobile telephone is merely illustrative of one type of acoustic device system 400 that may benefit from, employ, or otherwise be involved with embodiments of the present invention and, therefore, should not be taken to limit the scope of embodiments of the present invention. Other types of computing devices may include wearable devices, portable digital assistants (PDAs), pagers, audio/video player, Internet-of-things devices, augmented reality devices, virtual reality devices, automated teller machine devices, electronic kiosk devices, or any combination of the aforementioned.

In an example embodiment, an acoustic wearable device may be paired to a mobile phone that includes the features shown in FIG. 4. Additionally or alternatively, the acoustic wearable device may include at least some of the components shown in FIG. 4 (e.g., a processor 410 and user input device 440) and communicate with the entity system device 200 directly (e.g., without having to be connected to a mobile device or otherwise).

Some embodiments of the acoustic device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the acoustic device system 400. For example, the processor 410 may include a digital signal processor device, a microprocessor device, and various analog to digital converters, digital to analog converters, and/or other support circuits. Control and signal processing functions of the acoustic device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the acoustic device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the acoustic device system 400 may be configured to operate with one or more air interface standards, communication protocols, modulation types, and access types. By way of illustration, the acoustic device system 400 may be configured to operate in accordance with any of a number of first, second, third, and/or fourth-generation communication protocols and/or the like.

As described above, the acoustic device system 400 may have a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The acoustic device system 400 may not, in some instances, have a user interface 430 and instead rely solely on acoustic communication (e.g., the user input device may be a microphone 440).

The user input devices 440, which allow the acoustic device system 400 to receive data from a user such as the user 110, may include any of a number of devices allowing the acoustic device system 400 to receive data from the user 110, such as a microphone and/or other acoustic input device(s). The user interface may also include a camera 480, such as a digital camera.

The acoustic device system 400 may also include a positioning system device 475 that is configured to be used by a positioning system to determine a location of the acoustic device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the acoustic device system 400. In other embodiments, the positioning system device 475 includes a proximity sensor or transmitter, such as an RFID tag, that can sense or be sensed by devices known to be located proximate a merchant or other location to determine that the acoustic device system 400 is located proximate these known devices.

The acoustic device system 400 further includes a power source 415, such as a battery, for powering various circuits and other devices that are used to operate the acoustic device system 400. Embodiments of the acoustic device system 400 may also include a clock or other timer 450 configured to determine and, in some cases, communicate actual or relative time to the processor 410 or one or more other devices.

The acoustic device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the acoustic device system 400 and/or one or more of the process/method steps described herein. For example, the memory 420 may include such applications as a conventional web browser application 422, an acoustic device authentication application 421, entity application 424. These applications also typically instructions to a graphical user interface (GUI) on the display 430 that allows the user 110 to interact with the entity system 200, the acoustic device authentication executor 300, and/or other devices or systems. The memory 420 of the acoustic device system 400 may comprise a Short Message Service (SMS) application 423 configured to send, receive, and store data, information, communications, alerts, and the like via the wireless telephone network 152. In some embodiments, the acoustic device authentication application 421 provided by the acoustic device authentication executor 300 allows the user 110 to access the acoustic device authentication executor 300. In some embodiments, the entity application 424 provided by the entity system 200 and the acoustic device authentication application 421 allow the user 110 to access the functionalities provided by the acoustic device authentication executor 300 and the entity system 200.

The memory 420 can also store any of a number of pieces of information, and data, used by the acoustic device system 400 and the applications and devices that make up the acoustic device system 400 or are in communication with the acoustic device system 400 to implement the functions of the acoustic device system 400 and/or the other systems described herein.

FIG. 5 is a diagram illustrating the registration of an acoustic device 400A-400D with an entity system. In an example embodiment, a device user can register an acoustic device with an entity system via a mobile application (e.g., mobile phone 520 may have an application that allows for a given acoustic device to be registered). Other methods of acoustic device registration may also be used (e.g., an entity may have a physical device, such as an ATM that allows for a user to register an acoustic device using a debit card 510 to identify the user and/or user accounts to associate with the given acoustic device). Each acoustic device 400A-400D can be registered, either by the same user or different users. Upon registration, each acoustic device 400A-400D is provided a unique NFT ID that can be associated with the given user associated with the acoustic device. Upon registration, the acoustic device can be authenticated via the NFT ID and potentially other authentication information that is associated with the user account (e.g., voice authentication). As discussed below in reference to FIG. 8, the NFT ID corresponds to an NFT associated with the acoustic device.

FIG. 6 illustrates the operations of using a registered acoustic device for a transfer with a third party. As such, a user 110 may initiate a transfer request, such as a payment or other voice command (e.g., at a point of sale device, online, and/or other transaction mediums). Upon initiating the payment or other voice command via the acoustic device 400, the acoustic device 400 may transmit the voice command, along with the NFT ID, to the entity system 200, as discussed below in reference to FIG. 8. Based on the NFT ID, the entity system 200 can authenticate the voice command (e.g., using voice verification to confirm that the user making the voice command matches a sample voice recording of the user associated with the acoustic device). Upon verification, the entity system 200 can transmit user account information to the acoustic device for communication with the third party. In some embodiments, the entity system 200 may communicate directly with the third party (e.g., the entity system 200 may send account information to the point of sale device for processing).

FIG. 7 illustrates an example architecture of an acoustic device. As such, the acoustic device may include an NFT controller 700, a transaction data storage 710, a voice controller 720, a notification controller 730, a payment controller 740, a communication controller 750, a microprocessor 760, and/or a digital touch display 770. The components may be individual components (e.g., individual controllers) or combined (e.g., one or more controllers that in combination perform the operations discussed). The acoustic device may be connected to a network (e.g., network 150 shown in FIG. 1). The acoustic device 400 may be in communication with the entity system 200 via the network or via other means of communication. The acoustic device NFT for each given acoustic device may be stored on a blockchain controlled or maintained by the entity system 200. As such, the acoustic device 400 may communicate with the entity system 200 allowing the operations discussed herein. Various components shown in FIG. 7 may correspond to one or more components shown in FIG. 4.

Referring now to FIG. 8, a method of augmented authentication using acoustic devices is provided. The method may be carried out by a system discussed herein (e.g., the entity system 200 and/or the acoustic device authentication executor 300). An example system may include at least one non-transitory storage device and at least one processing device coupled to the at least one non-transitory storage device. In such an embodiment, the at least one processing device is configured to carry out the method discussed herein.

Referring now to optional Block 800 of FIG. 8, the method may include receiving an acoustic device registration request from the device user to be associated with the given acoustic device. The acoustic device registration request may be a request to register an acoustic device with an entity system. The acoustic device registration request can include the device user to be associated with the given acoustic device. A given acoustic device can be registered with a device user. The registration of the acoustic device may be carried out through a mobile application (e.g., the device user can log into an account with the entity on a mobile application and select to register an acoustic device). Additionally or alternatively, acoustic devices can also get registered independent of a mobile application (e.g., the entity may have a physical machine, such as an ATM that allows for a user to register the acoustic device). Multiple acoustic devices may be registered to the same device user (e.g., the user may have multiple acoustic devices).

Referring now to optional Block 810 of FIG. 8, the method may include generating the acoustic device NFT and the NFT identifier for the acoustic device and storing the acoustic device NFT corresponding to the NFT identifier associated with the acoustic device on the blockchain. In response to an acoustic device registration request, the system is configured to generate a non-fungible token (NFT) with information relating to the acoustic device, the user, and one or more user accounts associated with the user. Each registered acoustic device has a distinct acoustic device NFT registered on the blockchain. NFTs associated with acoustic devices may also be stored across multiple blockchains. The entity associated with the entity system 200 may store and/or control the blockchain(s) containing the acoustic device NFTs.

Each registered acoustic device has a distinct NFT on the blockchain(s), such that the NFT identifier corresponds to the given NFT associated with the acoustic device. A device user may have multiple NFTs registered for different acoustic devices (e.g., each acoustic device associated with a user has a distinct NFT and a corresponding NFT identifier). Each NFT has a distinct NFT identifier that corresponds to the associated acoustic device. After generation, the NFT identifier is communicated to the acoustic device. The NFT identifier may be stored on the acoustic device. As discussed herein, the acoustic device may transmit the NFT identifier to the entity system 200 (or acoustic device authentication executor 300) as a part of the transfer request.

The NFT associated with the given acoustic device may also be associated with one or more user accounts of the device user. The one or more user accounts of the device user may include the user accounts that are maintained or facilitated by the entity in control of the blockchain (e.g., the entity associated with the entity system 200). For example, a financial institution may have a blockchain with acoustic device NFTs associated with acoustic devices and a device user and each NFT may also be associated with one or more user accounts of the device user maintained by the financial institution. As such, an acoustic device may have different NFTs associated with the acoustic device for different entities (e.g., for each financial institution, the NFT may be different for the same acoustic device). Alternatively, multiple entities may share information across the blockchain, such that the same NFT corresponds to the same acoustic device and user accounts at multiple entities.

Referring now to Block 820 of FIG. 8, the method may include receiving a transfer request including an NFT identifier from one of one or more acoustic devices. The transfer request may be a part of a transaction between the device user and a third party (e.g., a third party vendor). The transfer request may include information relating to said transaction (e.g., the intended vendor, the type of transaction, the amount of the transaction, and/or the like). The transfer request also includes the NFT identifier associated with acoustic device. The NFT identifier may be any identifier that allows the system to identify the NFT associated with the acoustic device. For example, the NFT identifier may be an identification number. The NFT identifier is stored on the acoustic device and corresponds to an NFT associated with the device user.

The transfer request may be received from the acoustic device as a verbal command (e.g., a voice command user may provide a verbal command to pay a certain amount via the acoustic device). The transfer request may also include additional information in addition to the verbal command, such as the NFT identifier. The transfer request may also be based on a communication between the acoustic device and a third party device (e.g., a point of sale device at a vendor location). For example, the third party device may communicate with the acoustic device relating to the transfer (e.g., using NFC or Bluetooth communication) and the user verbally approves the transfer via the acoustic device, resulting in the transfer request being transmitted to the system.

Referring now to Block 830 of FIG. 8, the method may include comparing the NFT identifier with one or more stored NFT identifiers to determine the given acoustic device associated with the NFT identifier. The system may include a database of stored NFT identifiers corresponding to the acoustic device NFTs. The system may be configured to find the NFT identifier in the transfer request within the database of stored NFT identifiers. Additionally or alternatively, the system may be configured to scan one or more NFTs in the blockchain to find the NFT containing the given NFT identifier from the transfer request.

The stored NFT identifier(s) correspond to the acoustic device NFT(s) stored on the blockchain(s) discussed above. Each NFT identifier corresponds to a different acoustic device NFT, such that a single NFT on the blockchain can be identified based on the NFT identifier included with the transfer request.

Upon determining the NFT associated with the acoustic device of the transfer request based on the NFT identifier, the system may be configured to access or receive various information relating to the user associated with the acoustic device. Said information may be accessed or received from the acoustic device NFT (e.g., the NFT may have the information stored therein). The information accessed or received can include authentication information (e.g., vocal sample, personal identification numbers, etc.), user account information (e.g., account numbers, account balances, etc.), and/or other information relating to the user. For example, the given acoustic device NFT can include any information the entity has relating to the device user (e.g., any information a financial institution has on a device user may be stored on the acoustic device NFT). Additionally or alternatively, the acoustic device NFTs may provide login information or other information that allows access to user accounts of the device user. For example, the acoustic device NFT may not necessarily have all user information and instead includes information for the system to access the given account.

In an instance in which the NFT identifier does not correspond to a stored NFT identifier (e.g., the acoustic device has not been registered with the entity), then additional requests or messages may be provided to the acoustic device (e.g., a message may be provided asking for manual entry of the NFT identifier or an error message may be provided).

Referring now to Block 840 of FIG. 8, the method may include confirming that the identity of the voice command user matches the device user associated with the acoustic device. The confirmation that the identity of the voice command user matches the device user associated with the acoustic device may be completed after determining the acoustic device NFT associated with the NFT identifier of the transfer request. The system is configured to determine that the voice command user (i.e., the user that makes the voice command of the transfer request) is the same user as the device user associated with the acoustic device.

The system is configured to compare the voice command of the transfer request with a voice sample of the device user. The voice sample may be received during registration of the acoustic device by the device user (e.g., the device user may be prompted to provide a voice sample for use in the comparison). Additionally or alternatively, the voice sample may be obtained independent of any acoustic device registration. For example, a user opening an account with the entity may be asked for a voice sample for use by the entity. The voice sample may be used exclusively for authentication purposes, such as the operations discussed herein. The voice sample and the voice command of the transfer request may be compared using various voice comparison technologies (e.g., using speech recognition technology). For example, the system may use inverse filtering and/or analysis of voice characteristics, such as phonation, pitch, loudness, and rate to compare the voice sample with the voice command of the transfer request.

In an instance in which the identity of the voice command user does not match the device user associated with the acoustic device, the operations may be ended (e.g., the transfer request may not be carried out as requested). Additionally, the system may cause a transmission of a message to the acoustic device that the identity could not be verified. In some instances, the voice command user may be prompted to communicate the voice command again, allowing the system to perform another speech analysis.

Upon confirmation that the identity of the voice command user does match the device user associated with the acoustic device, the system may proceed with performing the operations discussed in reference to Block 850.

The method may also include other types of authentication to confirm that the device user is the same user as the voice command user. For example, the voice command user may be prompted via the acoustic device to provide a personal identification number (PIN). The PIN may be inputted verbally (e.g., the voice command user may say the PIN into the acoustic device) or haptically (e.g., the voice command user may tap the acoustic device a certain amount of times corresponding to the PIN). The other confirmation methods may be used in place of or in addition to the speech analysis discussed herein.

Referring now to Block 850 of FIG. 8, the method may include causing an authentication of the transfer request upon confirming the acoustic device is associated with the voice command user. Upon determination that the voice command using corresponds to the device user associated with the acoustic device of the transfer request, the system is configured to authorize the transfer request.

The authorization of the transfer request may include processing the transfer as requested (e.g., paying for a transaction out of an account of the device user). Additionally or alternatively, the authorization of the transfer request may include providing account information of an account associated with the device user via the acoustic device, such that the acoustic device can transmit such account information to a third party (e.g., a point of sale vendor device). The acoustic device may store the account information received locally for future use. In such an instance, the acoustic device may have local authentication capabilities (e.g., local speech analysis or requiring an identification number).

Referring now to optional Block 860 of FIG. 8, the method may include receiving an acoustic confirmation of the device user from the acoustic device. The system may be configured to cause the transmission of a message to the acoustic device associated with the transfer request. The transmitted message may include the status of the transfer request (e.g., whether the transfer request was approved or declined). The message may also include a request from the acoustic device for additional information (e.g., a request for acoustic confirmation) to authenticate the transfer request. For example, the system may request a PIN associated with the device user in order to provide additional security. The acoustic confirmation is at least one of a verbal or haptic response to a request for acoustic confirmation.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for augmented authentication using acoustic devices, the system comprising:
    at least one non-transitory storage device; and
    at least one processing device coupled to the at least one non-transitory storage device, wherein the at least one processing device is configured to:
    generate one or more acoustic device NFT and an NFT identifier for one or more acoustic devices, wherein the acoustic device NFT comprises data about the acoustic device, a user, and a user account, wherein the acoustic device NFT is stored in multiple locations across a distributed ledger for validation;
    receive a transfer request including the NFT identifier from the one of one or more acoustic devices, wherein the transfer request comprises a verbal command from a voice command user, wherein the NFT identifier corresponds to one of the one or more acoustic device NFT that is associated with the given acoustic device and a device user, wherein the one or more acoustic devices has a different acoustic device NFT for each different entity holding a user account, wherein multiple entities share the distributed ledger;
    compare the NFT identifier with one or more stored NFT identifiers to determine the given acoustic device associated with the NFT identifier, wherein the one or more stored NFT identifiers correspond to the one or more acoustic device NFTs stored on a blockchain, wherein each of the one or more acoustic device NFTs is associated with a unique acoustic device of the one or more acoustic devices;
    confirm that the identity of the voice command user matches the device user associated with the acoustic device, wherein confirming the identity of the voice command user matches the device user associated with the acoustic device comprises comparing the transfer request with a voice sample of the device user; and
    cause an authentication of the transfer request upon confirming the acoustic device is associated with the voice command user, wherein the authentication comprises transmitting user account information to the acoustic device for execution of a transfer relating to the transfer request.

2. The system of claim 1, wherein the at least one processing device is further configured to:
    receive an acoustic device registration request from the device user to be associated with the given acoustic device; and
    generate the acoustic device NFT and the NFT identifier for the given acoustic device.

3. The system of claim 2, wherein the at least one processing device is further configured to store the acoustic device NFT corresponding to the NFT identifier associated with the given acoustic device on the blockchain.

4. The system of claim 2, wherein the acoustic device registration request is received from an application on a mobile phone.

5. The system of claim 1, wherein the at least one processing device is further configured to register, along with the NFT identifier, one or more user accounts associated with the device user.

6. The system of claim 1, wherein each of the one or more acoustic device NFTs correspond to a non-fungible token registered in the blockchain, wherein the non-fungible token comprises information relating to the acoustic device, the device user, and one or more user accounts associated with the device user.

7. The system of claim 1, wherein the at least one processing device is further configured to receive an acoustic confirmation of the device user from the acoustic device, wherein the acoustic confirmation is at least one of a verbal or haptic response to a request for acoustic confirmation.

8. A computer program product for augmented authentication using acoustic devices, the computer program product comprising at least one non-transitory computer-readable medium having computer-readable program code portions embodied therein, the computer-readable program code portions comprising:
    an executable portion configured to generate one or more acoustic device NFT and an NFT identifier for one or more acoustic devices, wherein the acoustic device NFT comprises data about the acoustic device, a user, and a user account, wherein the acoustic device NFT is stored in multiple locations across a distributed ledger for validation;
    an executable portion configured to receive a transfer request including the NFT identifier from the one of one or more acoustic devices, wherein the transfer request comprises a verbal command from a voice command user, wherein the NFT identifier corresponds to one of the one or more acoustic device NFT that is associated with the given acoustic device and a device user, wherein the one or more acoustic devices has a different acoustic device NFT for each different entity holding a user account, wherein multiple entities share the distributed ledger;
    an executable portion configured to compare the NFT identifier with one or more stored NFT identifiers to determine the given acoustic device associated with the NFT identifier, wherein the one or more stored NFT identifiers correspond to the one or more acoustic device NFTs stored on a blockchain, wherein each of the one or more acoustic device NFTs is associated with a unique acoustic device of the one or more acoustic devices;
    an executable portion configured to confirm that the identity of the voice command user matches the device user associated with the acoustic device, wherein confirming the identity of the voice command user matches the device user associated with the acoustic device comprises comparing the transfer request with a voice sample of the device user; and
    an executable portion configured to cause an authentication of the transfer request upon confirming the acoustic device is associated with the voice command user, wherein the authentication comprises transmitting user account information to the acoustic device for execution of a transfer relating to the transfer request.

9. The computer program product of claim 8, wherein the computer-readable program code portions further comprise an executable portion configured to:
    receive an acoustic device registration request from the device user to be associated with the given acoustic device; and generate the acoustic device NFT and the NFT identifier for the given acoustic device.

10. The computer program product of claim 9, wherein the computer-readable program code portions further comprise an executable portion configured to store the acoustic device NFT corresponding to the NFT identifier associated with the given acoustic device on the blockchain.

11. The computer program product of claim 9, wherein the acoustic device registration request is received from an application on a mobile phone.

12. The computer program product of claim 8, wherein the computer-readable program code portions further comprise an executable portion configured to register, along with the NFT identifier, one or more user accounts associated with the device user.

13. The computer program product of claim 8, wherein each of the one or more acoustic device NFTs correspond to a non-fungible token registered in the blockchain, wherein the non-fungible token comprises information relating to the acoustic device, the device user, and one or more user accounts associated with the device user.

14. The computer program product of claim 8, wherein the computer-readable program code portions further comprise an executable portion configured to receive an acoustic confirmation of the device user from the acoustic device, wherein the acoustic confirmation is at least one of a verbal or haptic response to a request for acoustic confirmation.

15. A computer-implemented method for augmented authentication using acoustic devices, the method comprising:

generating one or more acoustic device NFT and an NFT identifier for one or more acoustic devices, wherein the acoustic device NFT comprises data about the acoustic device, a user, and a user account, wherein the acoustic device NFT is stored in multiple locations across a distributed ledger for validation;

receiving a transfer request including the NFT identifier from the one of one or more acoustic devices, wherein the transfer request comprises a verbal command from a voice command user, wherein the NFT identifier corresponds to one of the one or more acoustic device NFT that is associated with the given acoustic device and a device user, wherein the one or more acoustic devices has a different acoustic device NFT for each different entity holding a user account, wherein multiple entities share the distributed ledger; comparing the NFT identifier with one or more stored NFT identifiers to determine the given acoustic device associated with the NFT identifier, wherein the one or more stored NFT identifiers correspond to the one or more acoustic device NFTs stored on a blockchain, wherein each of the one or more acoustic device NFTs is associated with a unique acoustic device of the one or more acoustic devices;

confirming that the identity of the voice command user matches the device user associated with the acoustic device, wherein confirming the identity of the voice command user matches the device user associated with the acoustic device comprises comparing the transfer request with a voice sample of the device user; and causing an authentication of the transfer request upon confirming the acoustic device is associated with the voice command user, wherein the authentication comprises transmitting user account information to the acoustic device for execution of a transfer relating to the transfer request.

16. The method of claim 15, further comprising:

receiving an acoustic device registration request from the device user to be associated with the given acoustic device; and generating the acoustic device NFT and the NFT identifier for the given acoustic device.

17. The method of claim 16, further comprising storing the acoustic device NFT corresponding to the NFT identifier associated with the given acoustic device on the blockchain.

18. The method of claim 15, further comprising registering, along with the NFT identifier, one or more user accounts associated with the device user.

19. The method of claim 15, wherein each of the one or more acoustic device NFTs correspond to a non-fungible token registered in the blockchain, wherein the non-fungible token comprises information relating to the acoustic device, the device user, and one or more user accounts associated with the device user.

20. The method of claim 15, further comprising receiving an acoustic confirmation of the device user from the acoustic device, wherein the acoustic confirmation is at least one of a verbal or haptic response to a request for acoustic confirmation.

* * * * *